J. W. THORP.
HAY RETAINER.
APPLICATION FILED MAR. 30, 1915.
1,200,780.
Patented Oct. 10, 1916.
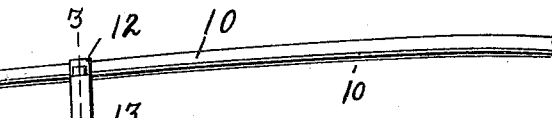
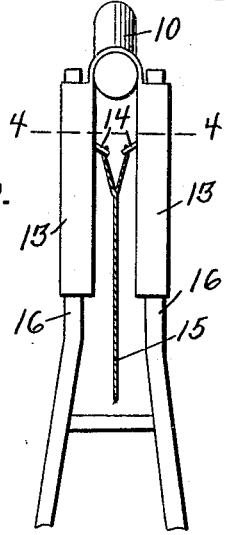
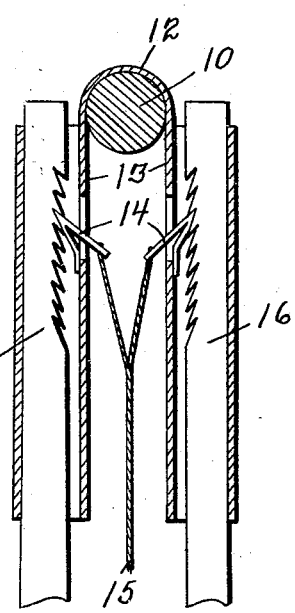
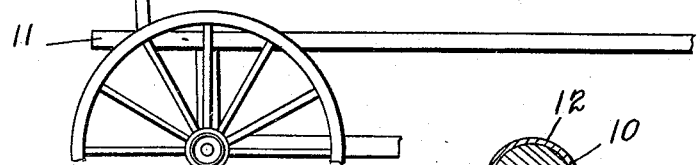
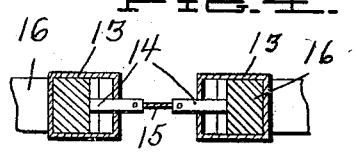
Inventor
J.W. Thorp

UNITED STATES PATENT OFFICE.

JOSEPH W. THORP, OF WEST TERRE HAUTE, INDIANA.

HAY-RETAINER.

1,200,780.

Specification of Letters Patent.

Patented Oct. 10, 1916.

Application filed March 30, 1915. Serial No. 18,154.

*To all whom it may concern:*

Be it known that I, JOSEPH W. THORP, a citizen of the United States, residing at West Terre Haute, in the county of Vigo, State of Indiana, have invented certain new and useful Improvements in Hay-Retainers; and I do hereby declare the following to be a full, clear, and exact description of the invention, such as will enable others skilled in the art to which it appertains to make and use the same.

This invention relates to improvements in binders and particularly to devices for binding loads of hay.

The principal object of the invention is to provide a suitable locking device for the free end of the hay retaining pole of the hay wagon.

Another object is to provide a simple and efficient device of this character which can be quickly and easily moved into and out of operative position.

Other objects and advantages will be apparent from the following description when taken in connection with the accompanying drawing.

In the drawing: Figure 1 is a side elevation of my improved device, Fig. 2 is a rear elevation, Fig. 3 is an enlarged vertical section on the line 3—3 of Fig. 1, and Fig. 4 is an enlarged horizontal section on the line 4—4 of Fig. 2.

Referring particularly to the accompanying drawing, 10 represents a portion of the hay retaining pole and 11 the rear portion of the hay wagon. Secured on the end of the pole and straddling the same is a metal member 12, the portions 13 which depend from the sides of the pole having channels therethrough, as clearly shown in the sections.

Mounted between the channel members are two spring pawls 14 to the inner ends of which is secured a cord or rope 15. Mounted on the rear of the wagon are two vertical parallel toothed bars 16 so spaced apart that each will enter one of the channel members 13 to permit of the engagement of the pawls with the teeth thereof.

What is claimed is:

A releasable connecting device comprising a pair of vertical parallel ratchet toothed bars, a pair of parallel tubular members arranged to receive the bars slidably therein, the inner portions of the tubular members being formed with longitudinal openings, substantially V-shaped springs secured at one end to the tubular members below the openings and extending through the openings in position to engage the teeth of the bars, the remaining ends of the springs extending toward each other and between the tubular members, and a flexible releasing element connected to the last-named ends of the springs for flexing the springs into and out of engagement with the teeth of the bars.

In testimony whereof, I affix my signature, in the presence of two witnesses.

JOSEPH W. THORP.

Witnesses:
 DANIEL V. MILLER,
 NOBLE J. JOHNSON.

Copies of this patent may be obtained for five cents each, by addressing the "Commissioner of Patents, Washington, D. C."